Patented Oct. 23, 1928.

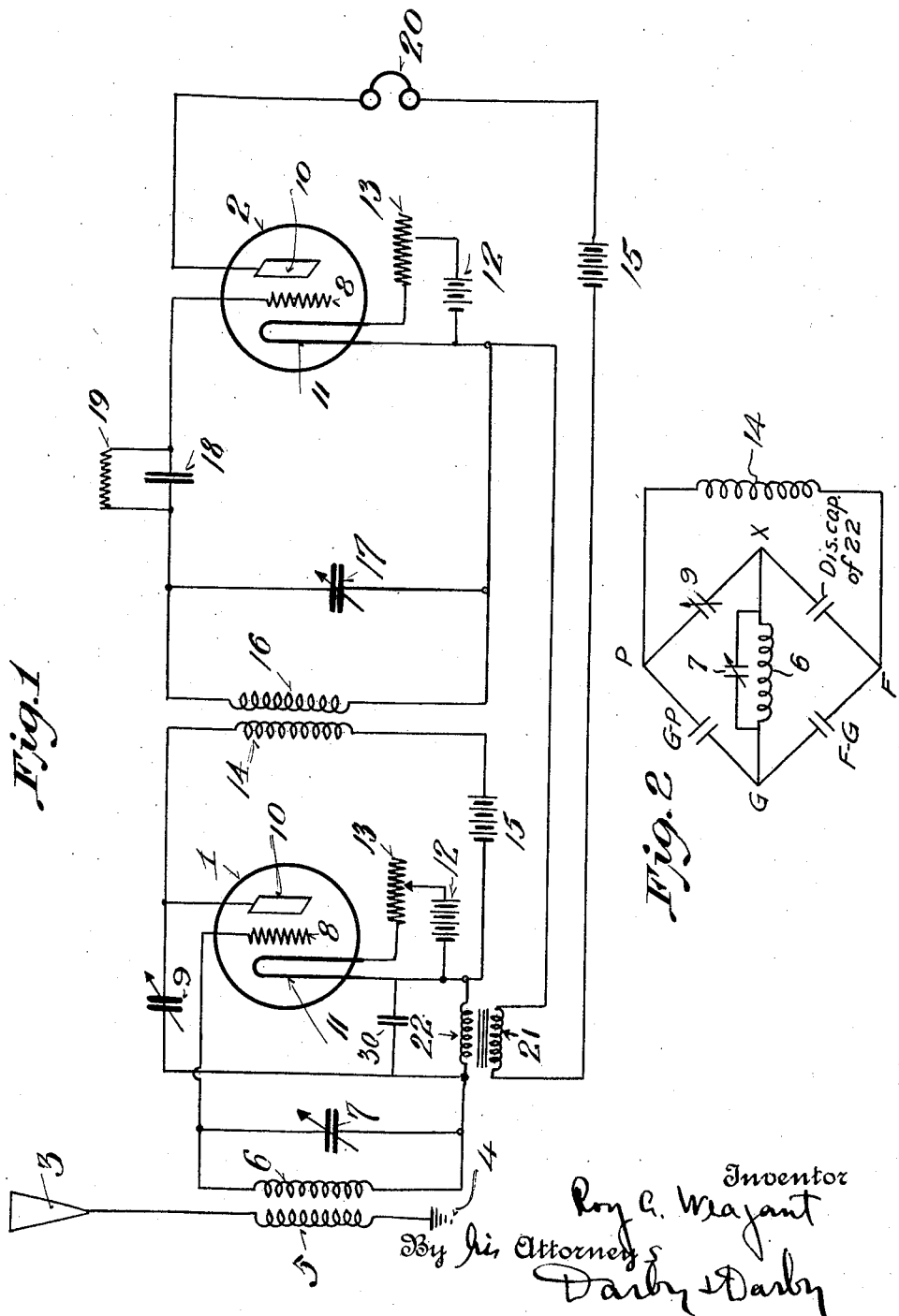

1,688,842

UNITED STATES PATENT OFFICE.

ROY A. WEAGANT, OF DOUGLASTON, NEW YORK, ASSIGNOR TO DE FOREST RADIO COMPANY, OF JERSEY CITY, NEW JERSEY, A CORPORATION OF DELAWARE.

RADIO SIGNALING CIRCUITS.

Application filed January 31, 1925. Serial No. 5,923.

This invention relates to a radio signaling circuit and has for its principal object the provision of means for prevention of the setting up of disturbing oscillations, due to inherent or internal capacity or coupling between stages of vacuum tubes.

Further objects of the invention will appear more fully hereinafter.

The invention consists substantially in the construction, combination, location and relative arrangement of parts, as well as the circuit arrangement employed in connection therewith, all as will be more fully hereinafter set forth, as shown by the accompanying drawing and finally pointed out in the appended claims.

Referring to the drawings, Fig. 1 illustrates the circuit arrangement embodying the principles of my invention.

Fig. 2 is a diagrammatic illustration of the Wheatstone bridge formed by this circuit arrangement.

In my co-pending application Serial No. 752,835, I have shown and described various arrangements for accomplishing the generally stated objects of the present invention, which may be briefly described as controlling the phase relation between the currents as distinguished from neutralizing the capacity between the electrodes, by effecting a perfect balance between the nodal points of the circuits which are in the form of a Wheatstone bridge.

I have discovered that by utilizing the distributed capacity of the coils in certain types of circuit arrangements the same result is obtained in the same way; i. e., a balance is obtained whereby phase control is secured as distinguished from other types of prevention of oscillation generation. This balance is secured by having the ratio of the capacities of the external circuit which forms one arm of the bridge equal to the ratio of the plate-grid and grid-filament capacities in the other arm of the bridge, the input and output of the amplifier being connected to the nodal points of the bridge.

My present invention, therefore, is directed to a specific arrangement which may be conveniently employed in the construction of radio receiving sets.

I have shown my invention as applied to a simple, so-called reflex circuit, wherein radio frequency amplifier 1 feeds a simple detector 2, the output circuit of which is reflexed to the input circuit of the radio frequency amplifier. In this arrangement the antenna is designated by reference character 3 and is connected to ground 4 through inductance 5. An oscillating circuit, comprising an inductance 6 inductively associated with the coil 5 and shunted by a variable condenser 7, is connected to the grid electrode 8 of the audion 1 at one terminal and through a variable condenser 9 to the plate electrode 10 at the other terminal. The filament 11 is lighted from the battery 12 through the variable rheostat 13, in the usual well-known manner, and, similarly, the plate electrode 10 is connected through primary transformer coil 14 and "B" battery 15 to the filament 11. The input circuit of the audion detector 2 includes the usual secondary coil 16, shunted by the variable condenser 17, connected between the grid electrode 8 and the filament electrode 11, the grid lead in the form shown including the blocking condenser 18, shunted by the grid leak 19. The plate electrode 10 of the detector 2 is connected through telephone receivers 20 and "B" battery 15, through transformer coil 21, to filament 11 of the audion tube. The transformer coil 21 is a primary, the secondary 22 of which is connected between the grid and filament of the first audion 1.

The Wheatstone bridge formed by this circuit is shown in Fig. 2 in which G—P is grid to filament capacity, F—G is the filament to grid capacity, and the capacity between F—X is the distributed capacity of inductance 22. The input coil 6 is connected across the nodal points G and X and the output coil is connected across the nodal points F and P.

With this arrangement, and with properly designed coils, I have found that the distributed capacity of the coil 22 between the filament and grid electrodes may be of a value sufficient to by-pass the radio frequency oscillation, whereby a perfect balance—and thus phase control—as outlined in my co-pending application hereinbefore identified, is effected. In most instances, however, it may be advisable to employ a condenser which may be either variable, or fixed, not shown in the drawing, which condenser is shunted around the coil 22. Thus a very simple adaption of the phase control invention to a reflex circuit is obtained, wherein manufacturing problems are greatly minimized and manufacture simplified.

Many other instances of distributed capacity for the purpose of effecting phase control in various different types of circuits will readily occur to those skilled in the art without departing from the spirit and scope of my invention as defined in the appended claims.

Therefore, what I claim as new and useful, of my own invention, and desire to secure by Letters Patent, is:

1. A radio signaling circuit comprising a radio frequency amplifier having a grid-filament circuit, a plate-filament circuit and a grid-plate circuit, a detector coupled with the plate-filament circuit and having an output circuit coupled with the grid-filament circuit of said amplifier, and a capacity included in said grid-filament circuit, and a second capacity included in said grid-plate circuit having a predetermined ratio value with respect to said first mentioned capacity whereby a Wheatstone bridge is formed in which the plate-filament circuit of the detector is coupled across one set of nodal points and the plate-filament circuit of the amplifier is coupled across the other set of nodal points.

2. A radio signaling circuit comprising a radio frequency amplifier having a grid-filament circuit, a plate-filament circuit and a grid-plate circuit, a detector coupled with the plate-filament circuit and having an output circuit coupled with the grid-filament circuit of said amplifier, and a capacity included in said grid-filament circuit, and a second capacity included in said grid-plate circuit having a predetermined ratio value with respect to said first mentioned capacity proportioned to the ratio of the internal capacities of the amplifier whereby a Wheatstone bridge is formed in which the plate-filament circuit of the detector is coupled across one set of nodal points and the plate-filament circuit of the amplifier is coupled across the other set of nodal points.

3. A radio signaling circuit comprising a radio frequency amplifier having a grid-filament circuit, a plate filament circuit and a grid-plate circuit, a detector coupled with the plate-filament circuit and having an output circuit coupled with the grid-filament circuit of said amplifier, and a capacity included in said grid-filament circuit, and a second capacity included in said grid-plate circuit having a predetermined ratio value with respect to said first mentioned capacity proportioned to the radio of the internal capacities of the amplifier of their corresponding circuits whereby a Wheatstone bridge is formed in which the plate-filament circuit of the detector is coupled across one set of nodal points and the plate-filament circuit of the amplifier is coupled across the other set of nodal points.

In testimony whereof I have hereunto set my hand on this 23d day of January, A. D. 1925.

ROY A. WEAGANT.